(12) United States Patent
Brown et al.

(10) Patent No.: US 9,404,441 B2
(45) Date of Patent: Aug. 2, 2016

(54) LOW VELOCITY INJECTOR MANIFOLD FOR HYPERGOLIC ROCKET ENGINE

(75) Inventors: William S. Brown, Newbury Park, CA (US); Thomas M. Walczuk, Oak Park, CA (US); Rodney Noble, Lancaster, CA (US); Frederick Dodd, Oak Park, CA (US)

(73) Assignee: AEROJET ROCKETDYNE OF DE, INC., Canoga Park, CA (US)

( * ) Notice: Subject to any disclaimer, the term of this patent is extended or adjusted under 35 U.S.C. 154(b) by 2447 days.

(21) Appl. No.: 12/193,679

(22) Filed: Aug. 18, 2008

(65) Prior Publication Data

US 2010/0037590 A1  Feb. 18, 2010

(51) Int. Cl.
F02K 9/52 (2006.01)
F02K 9/44 (2006.01)

(52) U.S. Cl.
CPC ..... *F02K 9/52* (2013.01); *F02K 9/44* (2013.01); *F05D 2250/232* (2013.01)

(58) Field of Classification Search
USPC ........ 60/200.1, 211, 215, 257, 258, 725, 739, 60/742; 181/213, 220; 431/114
See application file for complete search history.

(56) References Cited

U.S. PATENT DOCUMENTS

| | | | |
|---|---|---|---|
| 2,551,113 A * | 5/1951 | Goddard | 60/258 |
| 2,993,334 A * | 7/1961 | Burton | 60/215 |
| 3,050,942 A * | 8/1962 | Dooley et al. | 60/258 |
| 3,603,092 A * | 9/1971 | Paine et al. | 60/258 |
| 3,687,224 A | 8/1972 | Lundin | |
| 4,081,252 A | 3/1978 | Osborg | |
| 4,100,993 A | 7/1978 | Feder | |
| 4,106,587 A | 8/1978 | Nash et al. | |
| 4,150,732 A | 4/1979 | Hoch et al. | |
| 4,161,104 A | 7/1979 | Ladacki | |
| 4,197,081 A | 4/1980 | Osborg | |
| 4,409,787 A | 10/1983 | Davi et al. | |
| 4,583,362 A | 4/1986 | Wagner | |
| 4,726,184 A | 2/1988 | Russell | |
| 4,825,819 A * | 5/1989 | Morash | 60/258 |
| 4,894,986 A | 1/1990 | Etheridge | |
| 4,944,362 A | 7/1990 | Motsinger et al. | |
| 5,271,226 A | 12/1993 | Stone | |
| 5,353,598 A | 10/1994 | Huck et al. | |
| 5,394,690 A | 3/1995 | Arszman et al. | |
| 5,456,065 A | 10/1995 | Dargies | |
| 5,619,851 A | 4/1997 | Johnson et al. | |
| 5,648,052 A | 7/1997 | Schaefer et al. | |
| 5,661,970 A | 9/1997 | Muller et al. | |
| 5,683,033 A | 11/1997 | Thayer | |

(Continued)

FOREIGN PATENT DOCUMENTS

| | | |
|---|---|---|
| GB | 2090334 | 7/1982 |
| SU | 1395845 | 5/1988 |

OTHER PUBLICATIONS

Sutton, G.P. and Biblarz, O., Rocket Propulsion Elements, Seventh Edition, John Wiley & Sons, New York, 2001, pp. 348-355.*

(Continued)

*Primary Examiner* — Lorne Meade
(74) *Attorney, Agent, or Firm* — Joel G Landau

(57) ABSTRACT

A fuel manifold for a thrust chamber assembly includes a main fuel chamber which is generally frustro-conical in shape. The main fuel chamber provides a resonance frequency that is different than an acoustic resonance frequency of a combustion chamber.

9 Claims, 5 Drawing Sheets

(56) References Cited

U.S. PATENT DOCUMENTS

| | | | |
|---|---|---|---|
| 5,823,478 A | 10/1998 | Dunn | |
| 5,857,323 A | 1/1999 | Beveridge et al. | |
| 5,983,626 A * | 11/1999 | Stahn et al. | 60/258 |
| 6,079,101 A | 6/2000 | Kreiner et al. | |
| 6,116,020 A | 9/2000 | Cornelius et al. | |
| 6,116,375 A | 9/2000 | Lorch et al. | |
| 6,138,450 A | 10/2000 | Kreiner et al. | |
| 6,138,451 A | 10/2000 | Kreiner et al. | |
| 6,170,258 B1 | 1/2001 | Katorgin et al. | |
| 6,249,967 B1 | 6/2001 | Kreiner et al. | |
| 6,269,630 B1 | 8/2001 | Kreiner et al. | |
| 6,298,868 B1 | 10/2001 | Dean et al. | |
| 6,314,719 B1 | 11/2001 | Hunt et al. | |
| 6,341,762 B1 | 1/2002 | Dean et al. | |
| 6,375,118 B1 | 4/2002 | Kibens et al. | |
| 6,381,949 B1 | 5/2002 | Kreiner et al. | |
| 6,383,319 B1 | 5/2002 | Humble et al. | |
| 6,470,669 B2 | 10/2002 | Jones et al. | |
| 6,497,091 B1 | 12/2002 | Taylor et al. | |
| 6,584,764 B2 | 7/2003 | Baker | |
| 6,647,888 B1 | 11/2003 | Cesaroni et al. | |
| 6,799,417 B2 | 10/2004 | Hewitt | |
| 6,802,179 B2 | 10/2004 | Hewitt | |
| 6,807,805 B2 | 10/2004 | Watkins | |
| 6,832,471 B2 | 12/2004 | Hewitt | |
| 6,845,605 B1 | 1/2005 | Taylor et al. | |
| 6,847,016 B2 * | 1/2005 | Hirst | 219/486 |
| 6,849,247 B1 | 2/2005 | Wagaman et al. | |
| 6,883,301 B2 * | 4/2005 | Woltmann | 60/725 |
| 6,908,298 B1 | 6/2005 | Dykema | |
| 6,984,273 B1 | 1/2006 | Martin et al. | |
| 7,080,514 B2 | 7/2006 | Bland et al. | |
| 7,150,409 B2 | 12/2006 | Gonnelli et al. | |
| 7,246,483 B2 | 7/2007 | Minick et al. | |
| 7,302,802 B2 | 12/2007 | Alkabie | |
| 2005/0286998 A1 * | 12/2005 | Lee et al. | 415/117 |
| 2007/0137616 A1 * | 6/2007 | Badding et al. | 123/406.11 |
| 2007/0163228 A1 * | 7/2007 | Brown et al. | 60/257 |
| 2009/0061369 A1 * | 3/2009 | Wang et al. | 431/114 |
| 2009/0293483 A1 * | 12/2009 | Bishara et al. | 60/740 |

OTHER PUBLICATIONS

Shigley, J.E., Mechanical Engineering Design, Second Edition, McGraw-Hill Kogakusha, Ltd., Tokyo, 1972, pp. 376-377.*
Petroski, H., Things Happen, Mechanical Engineering, vol. 134, No. 3, Mar. 2012, pp. 38-41.*
ENPM684—Rocket Propulsion, Lecture 9—Liquid Propellants and Combustion Stability, University of Maryland, Fall 2013, pp. 1-36.*

* cited by examiner

US 9,404,441 B2

LOW VELOCITY INJECTOR MANIFOLD FOR HYPERGOLIC ROCKET ENGINE

BACKGROUND

The present invention relates to a rocket engine, and more particularly to a fuel manifold for the injector of a hypergolic rocket engine.

Hypergolic rocket engines typically utilize two propellants, usually an oxidizer such as Nitrogen Tetroxide (NTO) and a fuel such as Monomethylhydrazine (MMH). Performance increases over NTO/MMH propellant combinations have been provided by utilization of MON-25 (25% Mixed Oxides of Nitrogen and 75% Nitrogen Tetroxide (NTO)) as the oxidizer to provide a MON-25/MMH propellant combination.

Hypergolic rocket engines which utilize the MON-25/MMH propellant combination may be relatively sensitive to pulsing frequencies imparted from the propellant system. Compact vehicles which provide relatively small packaging envelopes may only further complicate this sensitivity.

SUMMARY

A fuel manifold for an injector body of a thrust chamber assembly according to an exemplary aspect of the present invention includes a main fuel chamber which is generally frustro-conical in shape.

A rocket engine according to an exemplary aspect of the present invention includes a fuel manifold defined within an injector body, the fuel manifold comprises a main fuel chamber which is generally frustro-conical in shape and defined about an axis. An oxidizer manifold is formed within the injector body, generally along the axis such that the main fuel chamber is defined around at least a section of the oxidizer manifold.

A rocket engine according to an exemplary aspect of the present invention includes a combustion chamber having an acoustic resonance frequency and a fuel manifold having a resonance frequency different than the acoustic resonance frequency.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
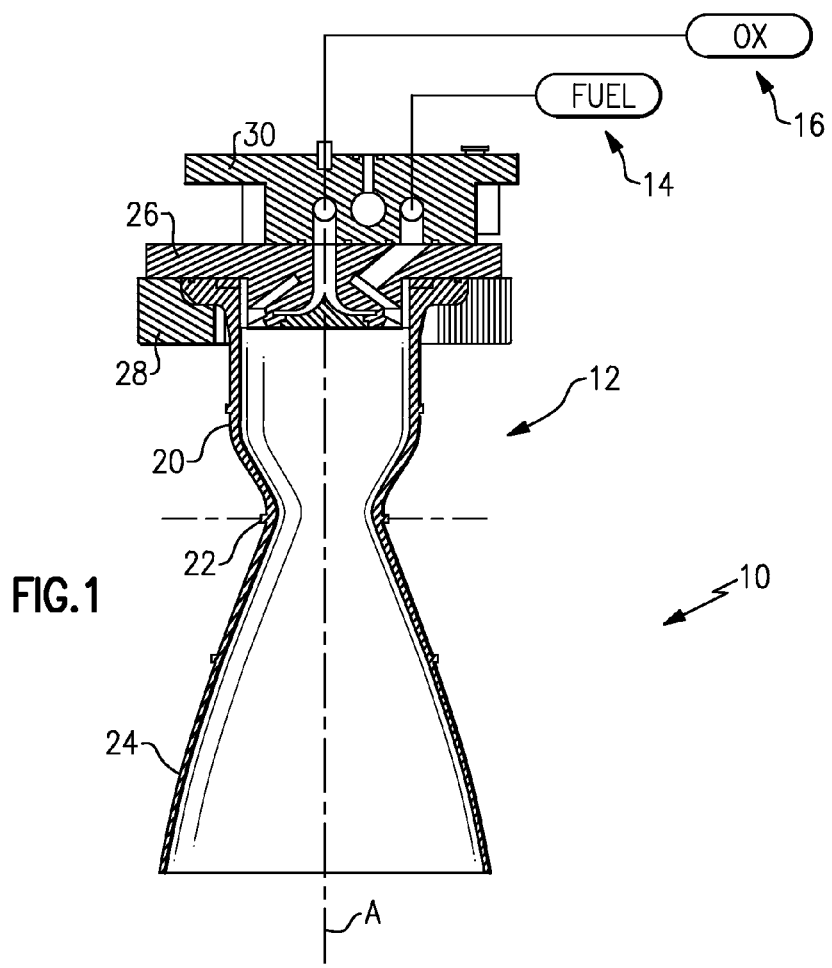
FIG. 1 is a general longitudinal schematic sectional view of an exemplary rocket engine for use with the present invention.

FIG. 1 illustrates a general schematic view of a hypergolic rocket engine 10 such as high performance divert and attitude control thruster to maneuver a vehicle in a boost phase, midcourse or terminal phase intercept mission. The engine 10 generally includes a thrust chamber assembly 12 powered by a propellant system having a fuel system 14 and an oxidizer system 16. The fuel system 14 and the oxidizer system 16 provide a fuel and an oxidizer into the thrust chamber assembly 12. The propellant combination auto ignites within the thrust chamber assembly 12 to provide reliable performance and thrust.

The propellant combination in one non-limiting embodiment includes MON-25 (25% Mixed Oxides of Nitrogen and 75% Nitrogen Tetroxide (NTO)) as the oxidizer and monomethylhydrazine (MMH) as the fuel. MON-25 is highly reactive with MMH and has a tendency to drive unstable combustion processes. It should be understood that other oxidizers such as Nitrogen Tetroxide (NTO) and other fuels may alternatively or additionally be utilized.

The thrust chamber assembly 12 generally includes a combustion chamber 20, a throat 22 and a nozzle 24 which define a thrust axis A. It should be understood that although the thrust chamber assembly 12 is illustrated in a symmetric arrangement, other shapes and configurations will alternatively be used herewith. The combustion chamber 20 is retained adjacent an injector body 26 through a chamber retention ring 28. A valve system 30 selectively communicates the propellant combination into the injector body 26. Although a particular configuration is illustrated and described in the disclosed embodiment, other configurations will also benefit herefrom.

Figure 2A:
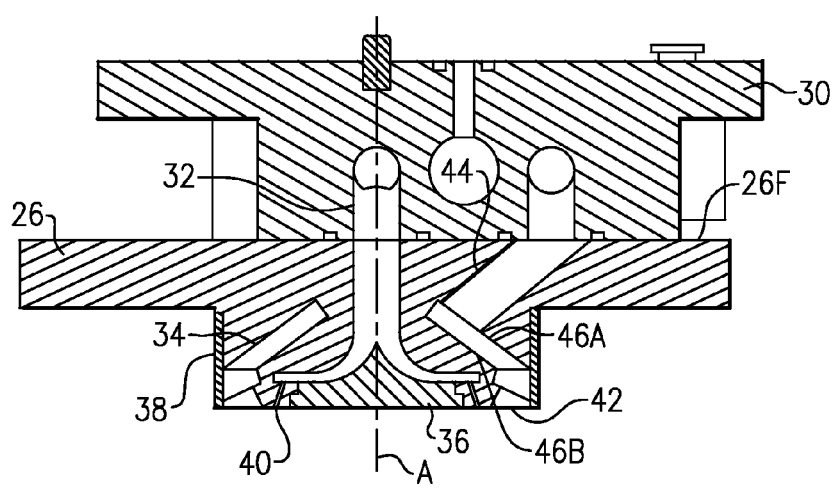
FIG. 2A is an expanded schematic sectional view of an injector body.

Referring to FIG. 2A, an oxidizer manifold 32 and a fuel manifold 34 are formed within the injector body 26. The oxidizer manifold 32 may be at least partially defined along the thrust axis A and the fuel manifold 34 may be at least partially defined there around in an annular relationship. A plug 36 mounted, for example by welding, to the injector body 26 may form at least a portion of the oxidizer manifold 32. A ring 38 mounted to the injector body 26 may form at least a portion of the fuel manifold 34. It should be understood that although a particular component arrangement which includes the plug 36 and the ring 38 to facilitate manufacture of the injector body 26, other arrangements will also benefit herefrom. The fuel manifold 34 may be utilized for any bi-propellant rocket engine which operate at various thrust levels from, for example, relatively small thrust attitude control thrusters, medium thrust divert engines, or large axial engine rocket engines.

Figure 2B:
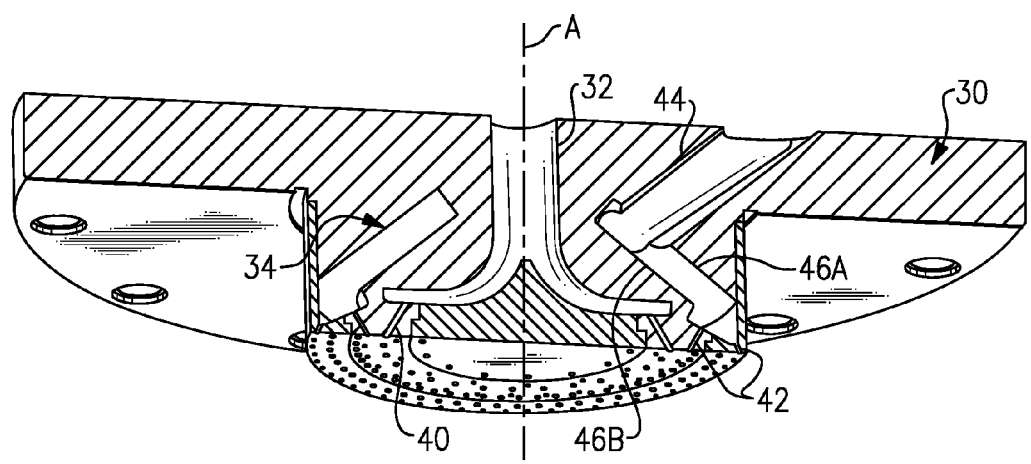
FIG. 2B is a perspective sectional view of an injector body.
Figure 2C:
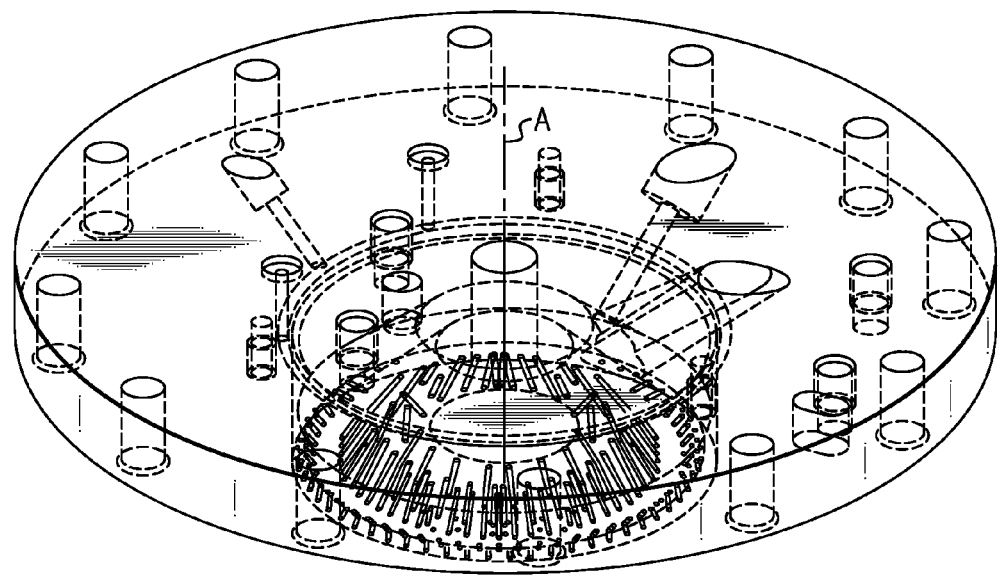
FIG. 2C is a partial phantom perspective view of an injector body.

Referring to FIG. 2B, the oxidizer manifold 32 communicates oxidizer therefrom through a plurality of oxidizer injector passages 40 and the fuel manifold 34 communicates fuel therefrom through a plurality of fuel injector passages 42. The plurality of oxidizer injector passages 40 are arranged about the thrust axis A and the plurality of fuel injector passages 42 are arranged generally around the plurality of oxidizer injector passages 40 (FIG. 2C).

Figure 3A:
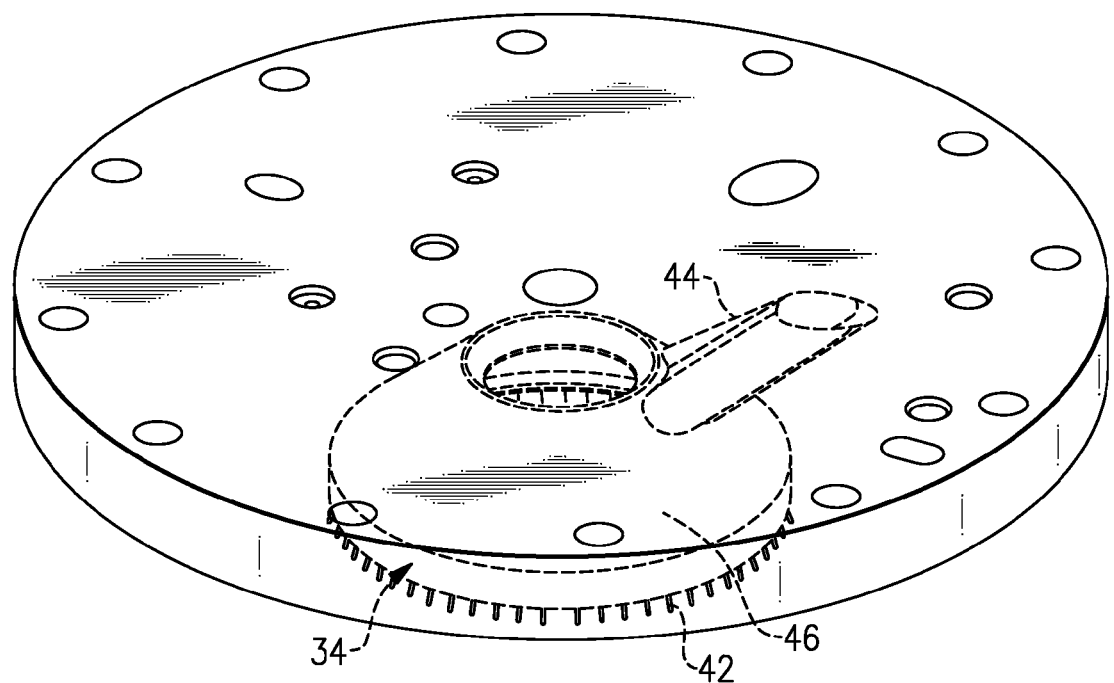
FIG. 3A is a partial phantom perspective view of an injector body illustrating the fuel manifold shaded.
Figure 3B:
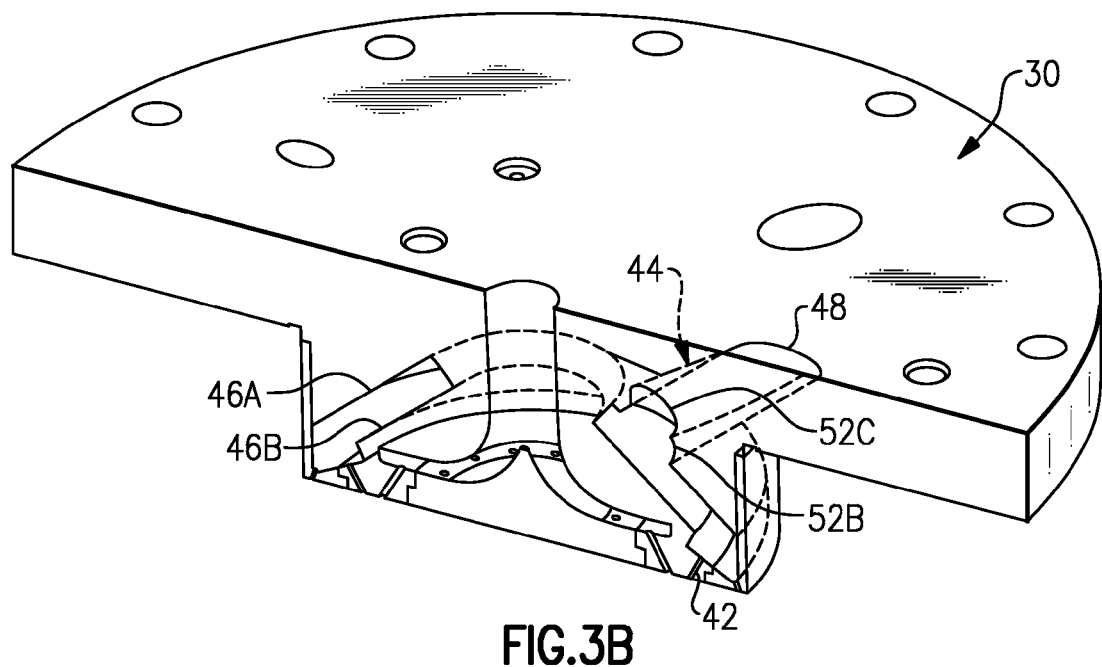
FIG. 3B is a partial phantom perspective view of the injector body sectioned to illustrate the fuel manifold.
Figure 4A:
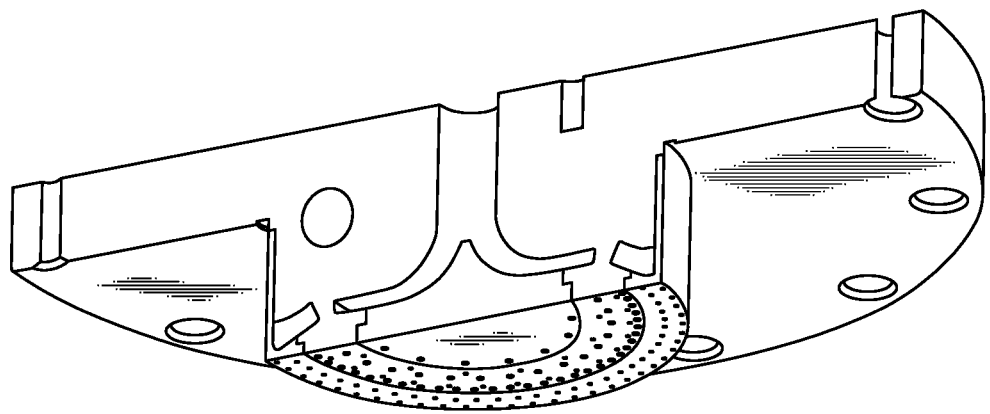
FIG. 4A is an expanded schematic sectional view of a RELATED ART injector body.

Referring to FIG. 3A, the fuel manifold 34 generally includes an inlet passage 44, a main fuel chamber 46 and the plurality of fuel injector passages 42. The main fuel chamber 46 is frustro-conical in shape as defined by a conical outer wall 46A and a conical inner wall 46B (FIG. 3B). In one non-limiting embodiment, the main fuel chamber 46 is formed as a 0.156 inch (4.0 mm) wide, 360 degree channel, machined to a depth of 0.755 inches (19.2 mm) at a 40 degree angle into the injector body 26 relative an injector-valve interface 26F which provides an approximately 600% larger fuel manifold which decreases the fuel velocity approximately 66% as compared to current state of the art manifolds (FIG. 4A). The fuel manifold 34 provides a significantly greater main fuel chamber relative current state of the art fuel manifolds (FIG. 4B) within a similar configuration design space.

Figure 4B:
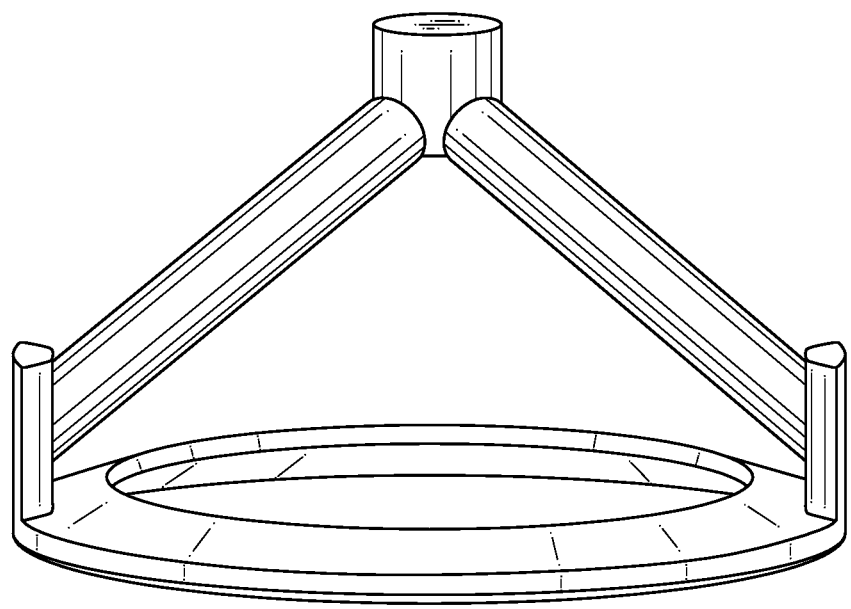
FIG. 4B is a perspective view of the RELATED ART fuel manifold separate from the injector body of FIG. 4A.

The inlet passage 44 in one non-limiting embodiment is oriented to 40 degrees relative the injector-valve interface 26F to intersect the conical outer wall 46A. In one non-limiting embodiment, the inlet passage 44 increases the total main fuel chamber of the inlet passage by upwards of 84% relative current state of the art manifolds (FIG. 4B).

Figure 3C:
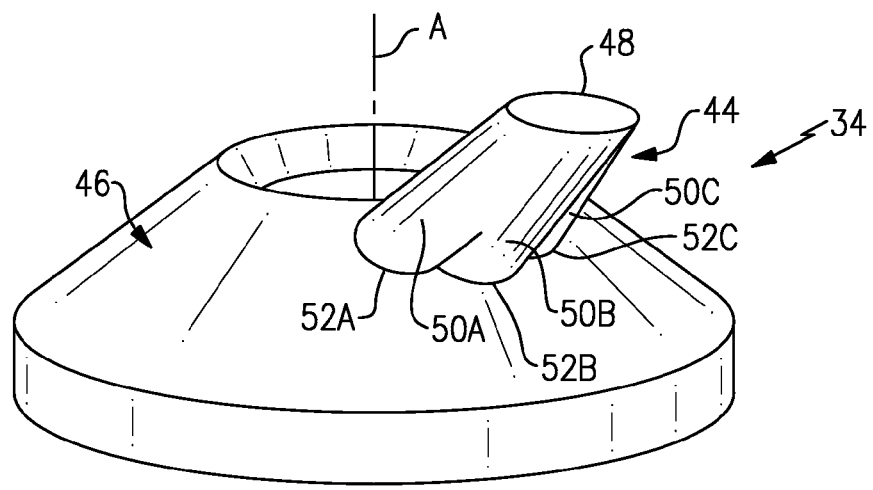
FIG. 3C is a perspective view of the fuel manifold volume separate from the injector body.

Referring to FIG. 3C, the inlet passage 44 includes a single common inlet 48 in fluid communication with the valve system 30. The inlet passage 44 splits from the single common inlet 48 into a multi-prong diffuser passage 50A, 50B, 50C which provide a respective plurality of exits 52A, 52B, 52C in fluid communication with the main fuel chamber 46. It should be understood that although a three-prong diffuser passage is illustrated in the disclosed non-limiting embodiment, any number of prongs may alternatively be provided to distribute fuel throughout the main fuel chamber 46 in a substantially uniform manner.

The multi-prong diffuser passage 50A, 50B, 50C may be formed as relatively distinct slant drilled passage with the single common inlet 48 such that each of the multi-prong diffuser passages 50A, 50B, 50C are at least partially open to each other along the length thereof. The multi-prong diffuser passage 50A, 50B, 50C are separate slant drilled passages which are drilled from the single common inlet 48 but angled to intersect the main fuel chamber 46 at different radial points. The multi-prong diffuser passage 50A, 50B, 50C communicates fuel into the main fuel chamber 46 through the respective plurality of exits 52A, 52B, 52C.

Figure 3D:
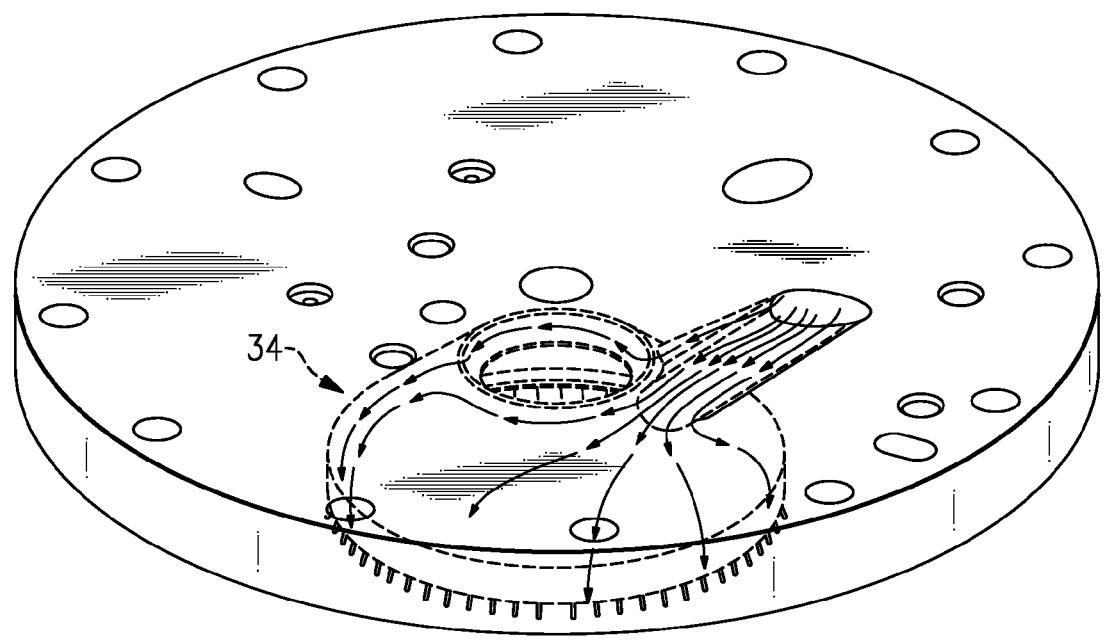
FIG. 3D is a partial phantom perspective view of an injector body illustrating the fuel manifold shaded with fuel flow velocity vectors schematically illustrated therein.

The significant volume of the multi-prong diffuser passage 50A, 50B, 50C slows the velocity of the fuel distributed into the main fuel chamber 46. The multi-prong diffuser passage 50A, 50B, 50C also imparts a directional velocity vector to the fuel entering the fuel manifold 34 to provide a relatively uniform fuel distribution around the main fuel chamber 46 to evenly distribute fuel into the plurality of fuel injector passages 42 at a decreased velocity (FIG. 3D). As the fuel strikes the conical inner wall surface 46B of the main fuel chamber 46, the velocity of the fuel is reduced and distributed around the main fuel chamber 46.

In operation, the fuel manifold 34 directs the fuel within the injector body 26 to communicate the fuel into the plurality of fuel injector passages 42 in an evenly distributed manner at a decreased velocity. The decreased velocity of the fuel minimizes fuel system oscillations and the potential to drive the combustion process unstable. Typically, an increase in fuel manifold volume would substantially increase response time, however, the calculated response time in this non-limiting embodiment results in an increase of only 4.5 milliseconds. This response time is relatively small and acceptable for a thruster of this class.

The calculated resonance frequency of the fuel manifold 34 in this non-limiting embodiment is 14,215 Hz which is substantially spaced from the thrust chamber assembly 12 1st tangential mode of approximately 9500 Hz so as to preclude organized harmonic oscillation and a stable MON-25/MMH propellant combination for operation of hypergolic rocket engines. That is, the fuel manifold 34 does not have the same fuel feed system resonant frequency as the chamber first tangential mode The stable MON-25/MMH propellant combination facilitates high performance, decreased propellant tank requirements, and lower vehicle weight. Decreased propellant tank requirements in part result in a smaller overall vehicle and decreased demand on the booster stages. The fuel manifold 34 facilitates mid-course and boost phase intercept missions for missile defense or space based operations.

To design the fuel manifold 34 to preclude coupling between the fluidics and the thrust chamber assembly 12 acoustics, a modal analysis is typically performed. Modal analysis includes a prediction of the fuel manifold 34 and transverse combustion chamber 20 resonances. The resonant frequencies are not common between the fuel manifold 34 and the combustion chamber 20.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A rocket engine comprising:
a combustion chamber having an acoustic resonance frequency; and
a fuel manifold having a resonance frequency that is different than said acoustic resonance frequency, said fuel manifold including a main fuel chamber that is frustroconical in shape, said main fuel chamber being directly coupled to the combustion chamber.

2. The rocket engine as recited in claim 1, wherein the rocket engine is a hypergolic rocket engine, the fuel manifold having a plurality of fuel injector passages for communicating fuel into the combustion chamber, further including an oxidizer manifold having an inlet and a plurality of oxidizer injector passages for communicating oxidizer into the combustion chamber.

3. The rocket engine as recited in claim 1, wherein said fuel manifold includes an inlet passage with multiple outlet lobes in fluid communication with said main fuel chamber, each of said multiple outlet lobes disposed at a discrete vector to uniformly distribute a fuel through the fuel manifold.

4. The rocket engine as recited in claim 1, wherein said fuel manifold further includes an inlet passage and a plurality of fuel injector passages that extend from said main fuel chamber to said combustion chamber, said plurality of fuel injector passages each having a uniform cross-sectional area between said main fuel chamber and said combustion chamber.

5. The rocket engine as recited in claim 1, wherein said fuel manifold further includes a plurality of fuel injector passages extending from said main fuel chamber to the combustion chamber and a single common inlet passage leading into said main fuel chamber.

6. The rocket engine as recited in claim 5, wherein said single common inlet passage splits into a plurality of passages that open into said main fuel chamber, said plurality of passages being open to each other.

7. The rocket engine as recited in claim 1, wherein said fuel manifold includes a single common inlet passage and a plurality of fuel injector passages that extend from said main fuel chamber to said combustion chamber, the single common inlet passage intersecting a conical outer wall of said main fuel chamber.

8. The rocket engine as recited in claim 1, wherein said main fuel chamber includes a conical outer wall and a conical inner wall.

9. The rocket engine as recited in claim 1, wherein said fuel manifold is defined annularly about a central axis and includes a single common inlet passage and a plurality of fuel injector passages that extend from said main fuel chamber to said combustion chamber, and said single common inlet passage is displaced from said axis.

\* \* \* \* \*